United States Patent
Nachbar

(10) Patent No.: US 7,841,561 B2
(45) Date of Patent: Nov. 30, 2010

(54) INTERNAL SUPPORT STRUCTURE FOR AN AIRSHIP

(76) Inventor: Daniel Nachbar, 110 Pulpit Hill, Amherst, MA (US) 01002

( * ) Notice: Subject to any disclaimer, the term of this patent is extended or adjusted under 35 U.S.C. 154(b) by 24 days.

(21) Appl. No.: 11/383,996

(22) Filed: May 18, 2006

(65) Prior Publication Data

US 2007/0267537 A1    Nov. 22, 2007

(51) Int. Cl.
*B64B 1/08* (2006.01)
*B64B 1/00* (2006.01)
(52) U.S. Cl. .................................. 244/125; 244/30
(58) Field of Classification Search ............... 244/125, 244/30, 25, 91, 127, 24, 31, 126, 128; 446/225
See application file for complete search history.

(56) References Cited

U.S. PATENT DOCUMENTS

| | | | | |
|---|---|---|---|---|
| 1,311,237 A | * | 7/1919 | Laisy | 244/2 |
| 1,658,452 A | * | 2/1928 | Mammen | 244/25 |
| 1,811,122 A | * | 6/1931 | Geisler et al. | 244/125 |
| 1,824,453 A | * | 9/1931 | Warth | 244/30 |
| 1,988,328 A | * | 1/1935 | Noelle | 244/101 |
| 3,446,457 A | * | 5/1969 | Struble | 244/30 |
| 6,311,925 B1 | * | 11/2001 | Rist | 244/30 |
| 6,708,922 B1 | * | 3/2004 | Hamilton | 244/30 |

* cited by examiner

*Primary Examiner*—Tien Dinh
*Assistant Examiner*—Richard R Green
(74) *Attorney, Agent, or Firm*—Daniel S. Coolidge

(57) ABSTRACT

A system and method for internally supporting a flexible envelope such as an airship is described, comprising a truss structure and supporting struts attached to a central support member. The internal structure may be foldable so as to allow the envelope to be collapsed when not in use.

17 Claims, 1 Drawing Sheet

INTERNAL SUPPORT STRUCTURE FOR AN AIRSHIP

This application claims priority from co-pending U.S. patent application Ser. No. 11/135,555.

TECHNICAL FIELD

This invention relates to stresses induced on a covered vessel moving through a gas or fluid, and more particularly to an improved internal support structure for such a vessel.

BACKGROUND

The stresses on an airship envelope, both on the supporting members and on the envelope, come in two varieties: hoop stress and suspension stress.

Hoop stress is the stress on the walls of a container, typically having a generally cylindrical cross section, when the pressure inside the container exceeds the pressure outside. This stress tends to cause the container to burst. The name comes from the hoops found on wooden barrels that are used to hold in the staves and withstand this type of stress.

It is a well established fact of mechanics that the magnitude of hoop stress increases linearly with the diameter of the cylinder as well as linearly with the pressure difference between the inside and outside.

Suspension stresses are essentially the inverse of hoop stresses. These stresses arise when the pressure outside the container exceed the pressure inside, with the pressure tending to make the container collapse or implode. As with hoop stress, the magnitude of suspension stresses increases linearly with the pressure difference between the inside and outside.

For a conventional pressurized airship at rest, all of the stresses on the envelope are the hoop stress. Further, these hoop stresses are greatest at the point of maximum diameter—typically at a point generally midway between the nose and tail of the ship.

At rest, the pressure distribution along the outside of an airship is at a uniform, ambient level. This pressure distribution changes as the airship starts to move through the air. However, the changes in external pressure are not straightforward. In fact, the pressure along the surface varies continuously along the direction of motion, typically parallel with the longitudinal axis of the envelope. At some points, pressure increases to a level greater than the ambient pressure. These are called "positive" aerodynamic forces. At other points, the pressure decreases to levels lower than the ambient pressure. These are called "negative" aerodynamic pressures. They are also sometimes referred to as "suction."

As with all aerodynamic forces, the pressures created (both positive and negative) increase in magnitude as the square of the velocity of the airship. So, when the speed of the craft is doubled, the resulting stresses (both hoop and suspension) increase by a factor of 4.

At the forward-most location, typically the very nose of the ship (called the forward stagnation point,) the outside pressure increases well above the ambient pressure and thus produces more of an inward (positive) force. In a conventional pressurized envelope, this positive pressure actually reduces hoop stress on the nose portion of the envelope. In fact, at a high enough airspeed, the positive pressure will exceed the internal gas pressure making the nose of the envelope want to buckle inward. At such a high speed, the nose ceases to sustain hoop stress and starts to sustain suspension stress.

The positive (inward) pressure created by the airflow is at its greatest at the nose of the ship. As the air flows back along the outside of the envelope, the magnitude of the inward force rapidly decreases. In fact, by the time the airflow is typically about one tenth of the way back towards the tail (i.e. 10% of the way along the direction of motion, typically the longitudinal axis,) the relatively positive pressure completely disappears. This creates a zero-crossing point where the external pressure remains essentially unchanged at the initial, ambient atmospheric level.

As the airflow continues along the outside of the envelope, the pressure continues to decrease, and can reach a level below the ambient level and thus create a negative (outward) aerodynamic stress which increases the hoop stress on the envelope material.

At the widest part of the ship (typically about halfway between nose and tail) the magnitude of the change pressure is between one half and one third of that found the nose of the ship—but obviously in the opposite direction.

After the midpoint of the ship, the airflow start to reconverge and likewise the external pressure starts to return to ambient (the magnitude of the suction decreases.) Depending upon the exact shape of the tail of the ship and other factors, the air pressure may remain slightly on the side of suction, drop to essentially ambient pressure, or cross back over to a positive pressure at the tail. The stresses along the tail are much smaller in magnitude (and thus much easier to support structurally) than the stresses on the nose and around the middle of the ship.

It is most inconvenient that in a typical lighter-than-air airship reduction in ambient pressure (with respect to the internal pressure) created by the airflow is greatest around the middle of the ship, just where the hoop stress is already relatively highest due to the larger diameter of the ship at that point.

The problem of hoop stress is quite severe for designs that use the conventional method of deliberately increasing the internal pressure of the envelope (so-called pressure ships) in order to provide structural support for the envelope. Since the hoop stress is linearly related to the difference in pressure between the inside and the outside of the envelope, increasing the internal pressure must necessarily increase the hoop stress by a comparable amount. By using a structurally reinforced envelope, hoop stresses may be reduced compared to a pressure ship design since the pressure inside the envelope doesn't need to be artificially increased above the ambient level in order to have the envelope retain its shape. Adding structural elements to stiffen the envelope also, unfortunately, adds weight to the airship.

What is needed is a lightweight yet strong structural element so as to reduce hoop stress by lessening the need for a positive internal pressure to keep the shape of the vessel.

BRIEF SUMMARY

The invention described has, in one embodiment, a system and method for the support of a flexible envelope such as an airship comprising one or more internal trusses attached to a central structural member. The trusses are supported by one or more struts slidingly attached to the central structural member so as to be able to slide along the central member and allow the trusses to collapse when the airship is not in use. Struts may be located in the nose, centrally and/or the tail of the envelope. In another embodiment, hard points are provided centrally and/or on the tail supported by one or more internal struts, to which hard points landing gear may be attached. Struts may be provided so as to support the flexible envelope at the aerodynamic zero crossing point in the fore portion of the airship.

The details of one or more embodiments of the invention are set forth in the accompanying drawing and the description below. Other features, objects, and advantages of the invention will be apparent from the description and drawings, and from the claims.

DETAILED DESCRIPTION

Figure 1:
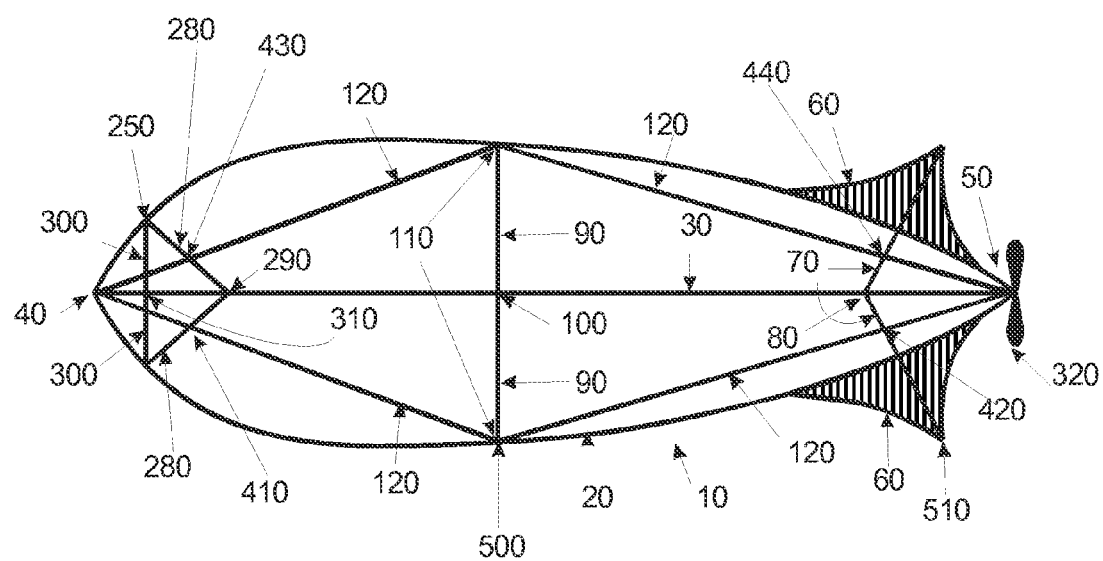
FIG. 1 is cutaway cross sectional view along the longitudinal axis of a vessel.

For purposes of description, we will use a generally cigar shaped cylindrical vessel with a flexible skin or envelope, such as a blimp or dirigible, but it may be seen by one skilled in the art that the invention may be beneficially used with other shaped vessels, including irregularly shaped vessels.

Referring to FIG. 1, a longitudinal cross sectional view of a vessel 10 is shown. An envelope 20 is used to retain the internal gas, such as a lifting gas. A central structural member (30) runs along the central axis of the airship connecting the front end 40 and tail end 50. A propulsion means 320 is provided on the tail end 50. Tail fins 60 are supported by tail fin struts 70. The tail fin struts 70 attach to the central structural member 30 at the tail fin joint 80. In a foldable design, the tail fin joint 80 would be hinged and/or capable of sliding longitudinally along the central structural member 30, and be able to be locked in place when unfolded. Additionally, it may be locked in place in intermediate positions to aid in the initial set up and to adjust for varying wind conditions.

Radial members 90 attach to the central structural member 30 at a radial member joint 100. In a foldable design, the radial member joint 100 is hinged and/or capable of sliding longitudinally along the central structural member 30, and to be locked in place when unfolded. Such sliding can be accomplished by a ring structure about the central member 30 with a locking mechanism or a rail and slide or other mechanism well known in the mechanical arts. The radial members 90 optionally obtain lateral support by attaching to the envelope 20 at their outer ends 110. In a foldable design, the joints at the outer ends 110 of the radial members 90 are hinged and/or capable of sliding longitudinally along the surface of the envelope 20, and to be able to be locked in place when unfolded. The struts may be made so as to be able to telescope so as to alter their length whilst folding and unfolding.

In one embodiment, the joint at the outer ends 110 of the radial members 90 attaches to the envelope 20 along adjacent to the flexible members of a foldable ribbed envelope as described in Nachbar U.S. Pat. No. 6,793,180. Outer members 120 connect the outer ends 110 of the radial members 90 to the central structural member 30 at the front end 40 and tail end 50.

In one embodiment, the outer members 120 are flexible rope, cable or line. In a foldable design, the lengths of the outer members 120 may be lengthwise adjustable.

An alternative approach to obtaining lateral support for radial members 90 and outer members 120 is to attach the outer members 120 to the nose members 280 at the outer member nose intersections 410 and 420. Similarly, the outer members 120 can obtain lateral support by attaching to the tail fin struts 70 at the outer member tail intersections 430 and 440.

Nose struts 280 attach to the central structural member 30 at the nose strut joint 290. In a foldable design, the nose strut joint 290 will be hinged and/or capable of sliding longitudinally along the central structural member. The nose struts 280 may attach to the envelope 20 at the aerodynamic pressure zero-crossing point 250. This has the effect of relieving the envelope components of the longitudinal oriented stresses at the nose. In a foldable design, the attachment between the nose strut 280 and the envelope 20 may be hinged and/or capable of sliding longitudinally along the envelope and to be locked in place when unfolded. In one embodiment, the nose struts 280 will attach to a foldable, ribbed envelope as described in U.S. Pat. No. 6,793,180 along one of the ribs of the envelope. Each nose strut 280 may be limited from spreading outward beyond a certain point by a flexible tensioning member 300, such as a wire rope, connected at one end to the outer end of the nose strut 280. The other end of the flexible tensioning member 300 may be attached to the central structural member 30. The nose radial member 300 can attach to the central structural member 30 at any number of longitudinal points along the central structural member 30 including a point 310 as to make it oriented perpendicularly to the central structural member 30 the very nose of the ship 40, or it can attach somewhere between those two points.

Nose radial members 300 attach to the central structural member at the nose radial joint 310. In a foldable design, the nose radial joint will be hinged and/or capable of sliding longitudinally along the central structural member and to be locked in place when unfolded. The nose radial members 300 will attach to the envelope 20 at the aerodynamic pressure zero-crossing point 250. In a foldable design the attachment point between the nose radial members 300 and the envelope 20 will be hinged and/or capable of sliding longitudinally along the envelope 20 and to be locked in place when unfolded. In one embodiment, the nose radial members will only be under tension and may thus be realized as a rope, cord or cable or other flexible means known in the art.

The central structural member 30 carries the aerodynamic forces from the nose 40 in column to the thrusting force located on the tail 50. Forward thrust is provided by a propulsion means 320 located at the tail of the ship. Thus the primary main thrust and drag loads are carried longitudinally by the central structural member 30 rather than by the envelope material.

The central structural member 30 is stiffened against buckling and/or bending by one or more sets of radially oriented struts 90 located longitudinally along the central structural member. These radially oriented struts are themselves supported longitudinally by one or more guys 120 running to the nose and tail. This structure is very similar to the spreaders and guys that are routinely used to stiffen sailboat masts. The radial struts 90 are supported laterally by attaching them to the envelope materials preferably linking them to the ribs of a foldable envelope structure. (Note: The lateral loads that the radial struts 90 place on the envelope 20 are very small in contrast to the longitudinal loads the support.) Alternatively, the radial struts 90 and associated guys 120 can be supported laterally by attaching the guys to the nose struts 280 and/or tail fin struts 70.

The truss structure formed by the central structural member 30, radial struts 90 and guys 120 not only supports the compressive longitudinal compressive loads but also carries the bending moments and associated stresses placed on the envelope. When a bending moment is placed on the entire ship, it is transferred to the central structural member 30 where it attaches to the nose 40 and/or tail 50 of the envelope 20 and/or by the nose struts 280 and tail fin struts 70. The bending moment is then is carried as tension in the guys 120 and as compression in the radial struts 90 and the central structural member 30.

In addition to the nose struts 280 located at the aerodynamic zero-crossing point 250, one or more additional sets of struts 300 may be located at the longitudinal points near the nose 40 to transfer even more loads to the central structural member 30. Similarly, one or more additional sets of struts (not shown), comparable to the nose struts, can be added to the tail end of the vessel in order to carry loads from an even larger portion of the envelope to the central structural member 30.

An additional benefit of the internal support structure herein described is that hard points (external points supported by the internal structure) 500 and/or 510 can be provided to support landing gear.

It is beneficial to provide structural support of the envelope 20 other than merely conventional internal air pressure. Otherwise, the airflow could wildly distort the envelope 20 and destroy the pressure gradient described above. The forces on this underlying support structure may be reduced by matching the internal and external pressures.

A number of embodiments of the invention have been described. Nevertheless, it will be understood that various modifications may be made without departing from the spirit and scope of the invention. For example, the principles of the invention are applicable to vessels other than lighter-than-air airships. Accordingly, other embodiments are within the scope of the following claims.

What is claimed is:

1. A system of support for an airship comprising an airship having a front end and a tail end and further having an overall length from the said front end to said tail end; and further having a skin, said skin having an internal surface and an external surface, a fore section proximate said front end, a central section and an aft section proximate said tail end, said airship further having a central portion, a fore portion and an aft portion;
   a central member oriented generally fore and aft within said airship, said central member having a fore portion and an aft portion and a longitudinal axis, said central member running the said overall length of said airship;
   at least one central attachment point proximate to the said internal surface of said skin and which is affixed to said internal surface of said skin by at least one chosen from the group consisting of hingedly, slidingly and fixedly;
   at least one radially oriented strut having an inner end and an outer end, said inner end slidingly, hingedly and lockably attached to said central member and said outer end hingedly attached to said at least one central attachment point such that said inner end may be slid along said central member with said outer end held in fixed longitudinal position with respect to the said longitudinal axis of said central member while the radial position of said outer end is free to move during collapse or expansion thus allowing the said strut to change position with respect to said central member from parallel through perpendicular;
   at least one first guy having a first end and a second end, wherein said first end of said at least one first guy is attached by at least one chosen from the group consisting of hingedly, slidingly and fixedly to one chosen from the group consisting of said fore portion of said central member and said aft portion of said central member, and said second end of said at least one first guy is attached to said at least one central attachment point;
   whereby said central member, said at least one radial strut and said at least one guy are operative to support longitudinal compressive loads and longitudinal bending moments placed on said airship.

2. The system of claim 1 wherein said guy is lengthwise manually adjustable to permit manually adjusting the tension of said guy and collapsing said support system by lengthening said guy.

3. The system of claim 1 further comprising at least one nose strut having a fore end and an aft end, and further comprising at least one fore attachment point proximate the said fore section of said skin and which is affixed to said internal surface of said skin by at least one chosen from the group consisting of hingedly, slidingly and fixedly;
   wherein said at least one nose strut is attached at said fore end to said at least one fore attachment point, and wherein said at least one nose strut is attached at said aft end to said central member at a location aft of said at least one fore attachment point by at least one selected from the group consisting of slidingly, hingedly and fixedly.

4. The system of claim 3 further comprising at least one fore tensioning member having a first end and a second end, wherein said first end of said at least one fore tensioning member is attached to said at least one fore attachment point, and said second end is attached by at least one selected from the group consisting of slidingly, hingedly and fixedly to said central member.

5. The system of claim 4 further comprising at least one aft tensioning member having a first end and a second end, and further comprising at least one aft attachment point proximate the said aft section of said skin and which is affixed to said internal surface of said skin by at least one chosen from the group consisting of hingedly, slidingly and fixedly;
   wherein said first end of said at least one aft tensioning member is attached to said aft attachment point, and said second end is attached to said central structural member by at least one selected from the group consisting of slidingly, hingedly and fixedly.

6. The system of claim 5 further comprising at least one tail strut having a fore end and an aft end wherein said at least one tail strut is attached at said aft end to said aft attachment point and wherein said fore end of said at least one tail strut is attached by at least one selected from the group consisting of slidingly, hingedly and fixedly to said central member in said aft portion and at a point fore of said aft attachment point and wherein at least one selected from the group consisting of said at least one aft tensioning member, said at least one tail strut, at least one fore tensioning member, at least one radially oriented strut and said at least one nose strut is lengthwise adjustable.

7. The system of claim 1 further comprising at least one tail strut having a fore end and an aft end, and further comprising at least one aft attachment point proximate the said aft section of said skin and which is affixed to said internal surface of said skin by at least one chosen from the group consisting of hingedly, slidingly and fixedly;
   wherein said at least one tail strut is attached at said aft end to said aft attachment point and wherein said fore end of said at least one tail strut is attached by at least one selected from the group consisting of slidingly, hingedly and fixedly to said central member in said aft portion and at a point fore of said aft attachment point.

8. The system of claim 1 further comprising at least one tail fin comprising a generally planar surface, said at least one tail fin further comprising an outer edge and further comprising a tail fin attachment point proximate said outer edge; and wherein said skin has an outer surface; and wherein said tail fin is oriented so that the said planar surface is generally parallel to the said central member and is attached to said external surface of said skin; and further comprising at least one tail strut, said at least one tail strut having a first end and a second end; and further comprising at least one aft attachment point located on said aft portion of said central member, wherein said at least one tail strut is attached at said first end to said at least one aft attachment point and extends beyond said aft attachment point and further penetrates the said skin and is attached at said second end to said tail fin attachment point to the said tail fin.

9. A method of support for an airship comprising: providing an airship, said airship having a front end, a tail end and an overall length from the said front end to the said tail end and a skin, said skin having an internal surface and an external surface, a fore section proximate said front end, a central section, and an aft section proximate said tail end, said airship further having a central portion, a fore portion and an aft portion;

providing a central member oriented generally fore and aft within said airship, said central member having a central portion, a fore portion and an aft portion, and said central member running said length of said airship;

providing at least one central attachment point proximate to the said internal surface of said skin and which central attachment point is affixed to said internal surface of said skin by at least one consisting of the group consisting of hingedly, slidingly and fixedly;

providing at least one radial strut, said at least one radial strut having a near end and a far end and an inner end and an outer end, said inner end slidingly, hingedly and lockably attached to said central member and said outer end hingedly attached to said at least one central attachment point such that said inner end may be slid along said central member with said outer end held in fixed longitudinal position with respect to the said longitudinal axis of said central member while the radial position of said outer end is free to move during collapse or expansion thus allowing the said strut to change position with respect to said central member from parallel through perpendicular;

providing at least one first guy, said at least one guy having a first end and a second end;

attaching said first end of said at least one first guy by at least one selected from the group consisting of slidingly, hingedly and fixedly to at least one chosen from the group consisting of said fore portion of said central member and said aft portion of said central member, and attaching said second end to said at least one central attachment point; thereby supporting the skin of said airship;

using said central member, said at least one radial strut and said at least one first guy to support longitudinal compressive loads and longitudinal bending moments placed on said airship.

10. The method of claim 9 further comprising providing at least one nose strut having a fore end and an aft end, and further providing at least one fore attachment point proximate the said fore section of said skin and which is affixed to said internal surface of said skin by at least one chosen from the group consisting of hingedly, slidingly and fixedly;

attaching said fore end of said at least one nose strut to said at least one fore attachment point, and further attaching said aft end of said at least one nose strut to said central member at a location aft of said at least one fore attachment point by at least one selected from the group consisting of slidingly, hingedly and fixedly.

11. The method of claim 10 further comprising providing at least one fore tensioning member having a first end and a second end;

attaching said first end of said at least one fore tensioning member to said at least one fore attachment point, and further attaching said second end of said at least one fore tensioning member to said central member at a location forward of said aft end of said at least one nose strut by at least one selected from the group consisting of slidingly, hingedly and fixedly.

12. The method of claim 10 further comprising:

providing at least one fore tensioning member having a first end and a second end, wherein said first end of said at least one fore tensioning member is attached to said at least one fore attachment point, and attaching said second end of said fore tensioning member to said central member by at least one selected from the group consisting of slidingly, hingedly and fixedly, at a point so as to make said fore tensioning member generally perpendicular to said central member.

13. The method of claim 12 further comprising the steps of providing at least one tail strut having a fore end and an aft end, and further providing comprising at least one aft attachment point proximate the said aft section of said skin and attached thereto by at least one selected from the group consisting of slidingly, hingedly and fixedly;

attaching said aft end of said at least one tail strut to said aft attachment point and attaching said fore end of said at least one tail strut to said central member in said aft portion by at least one selected from the group consisting of slidingly, hingedly and fixedly, and at a point fore of said aft attachment point wherein at least one selected from the group consisting of said at least one aft tensioning member, said at least one fore tensioning member, said at least one first guy, said at least one nose strut, said at least one tail strut and said at least one radial strut is lengthwise manually adjustable to adjust the tension of said at least one guy and to permit collapsing said support system by lengthening said guy.

14. The method of claim 9 further comprising: providing at least one tail strut having a fore end and an aft end, and further providing comprising at least one aft attachment point proximate the said aft section of said skin and attached thereto by at least one selected from the group consisting of slidingly, hingedly and fixedly;

attaching said aft end of said at least one tail strut to said aft attachment point and attaching said fore end of said at least one tail strut to said central member in said aft portion by at least one selected from the group consisting of slidingly, hingedly and fixedly, and at a point fore of said aft attachment point.

15. An airship having a front end and an aft end and having an overall length from the said airship front end to the said airship aft end and an internal support structure, comprising a skin, said skin having an internal surface and an external surface, said skin further having a central portion, a fore portion proximate said front end and an aft portion proximate said tail end;

further comprising a central member oriented generally fore and aft within said airship, said central member having a fore portion, a central portion and an aft portion and running said length of said airship;

further comprising a plurality of central attachment points proximate to the said central portion of said internal surface of said skin and which are affixed to said internal surface of said skin by at least one chosen from the group consisting of hingedly, slidingly and fixedly;

further comprising a plurality of radially oriented struts each having a first end and a second end, and each attached at said first end lockably and slidingly to said central portion of said central member so as to allow said struts to lie along said central member so as to allow collapse of the support system along said central member, and said second end attached to at least one of said central attachment points;

further comprising a plurality of first guys each having a first end and a second end, wherein said first end of at least one of said plurality of first guys is attached to one chosen from the group consisting of said fore portion of said central member and said aft portion of said central member, by at least one selected from the group consisting of slidingly, hingedly and fixedly, and said second end of said plurality of first guys is attached to one of said plurality of central attachment points;

whereby said central member, said at least one radial strut and said at least one guy are operative to support longitudinal compressive loads and longitudinal bending moments placed on said airship.

16. The airship of claim 15 further comprising a plurality of nose struts each having a fore end and an aft end, and further comprising plurality of fore attachment points proximate the said fore portion of said skin and which is affixed to said internal surface of said skin by at least one chosen from the group consisting of hingedly, slidingly and fixedly;

wherein at least one of said plurality of nose struts is attached at said fore end to one of said plurality of fore attachment point, and wherein each of said plurality of nose struts is attached at said aft end to said central member by at least one selected from the group consisting of slidingly, hingedly and fixedly, at a location aft of said at least one fore attachment point.

17. The airship of claim 15 further comprising a plurality of tail struts each having a fore end and an aft end, and further comprising a plurality of aft attachment points proximate the said aft portion of said skin and which is affixed to said internal surface of said skin by at least one chosen from the group consisting of hingedly, slidingly and fixedly;

wherein each of said plurality of tail struts is attached at said aft end to said at least one of said plurality of aft attachment points and wherein said fore end of each of said plurality of tail struts is attached to said central member by at least one selected from the group consisting of slidingly, hingedly and fixedly, at a point fore of said aft attachment point.

* * * * *